United States Patent [19]
Grote et al.

[11] Patent Number: 5,702,151
[45] Date of Patent: Dec. 30, 1997

[54] VEHICLE BODY INCLUDING LEAKPROOF DAMAGE RESISTANT WALL CONSTRUCTION

[75] Inventors: Philip B. Grote, Encinitas, Calif.; Robbie J. Sjostedt, Oregon, Wis.

[73] Assignee: Stoughton Composites, Inc., Brodhead, Wis.

[21] Appl. No.: 409,183

[22] Filed: Mar. 23, 1995

[51] Int. Cl.$^6$ .................................................. B62D 33/04
[52] U.S. Cl. .......................... 296/187; 296/181; 296/191; 296/901; 220/1.5; 220/670
[58] Field of Search ............................. 296/181, 183, 296/187, 191, 901; 220/1.5, 669, 670, 671, 678, 679, 680; 52/79.1, 274, 630, 784.14, 793.11

[56] References Cited

U.S. PATENT DOCUMENTS

| | | | |
|---|---|---|---|
| 2,871,056 | 1/1959 | Levitt | 296/106 |
| 2,962,323 | 11/1960 | McBride | 296/39.3 |
| 3,229,441 | 1/1966 | Heffner | 52/742.13 |
| 3,561,633 | 2/1971 | Morrison et al. | 220/1.5 |
| 3,801,177 | 4/1974 | Fylling et al. | 312/351 |
| 4,444,818 | 4/1984 | Tominaga et al. | 296/191 X |
| 4,837,999 | 6/1989 | Stayner | 52/309.11 |
| 4,904,017 | 2/1990 | Ehrlich | 296/181 |
| 4,984,406 | 1/1991 | Friesen | 52/588.1 |
| 5,072,845 | 12/1991 | Grogan | 220/1.5 |
| 5,255,806 | 10/1993 | Korzeniowski et al. | 220/1.5 |
| 5,403,062 | 4/1995 | Sjostedt et al. | 296/181 |
| 5,403,063 | 4/1995 | Sjostedt et al. | 296/187 |

*Primary Examiner*—Andrew C. Pike
*Attorney, Agent, or Firm*—Michael, Best & Friedrich LLP

[57] ABSTRACT

A vehicle body, such as a truck or trailer body, comprises an intermodal container, or the like, having a lightweight, leakproof, damage resistant and corrosion resistant wall construction. The wall construction includes a sheet-like panel reinforced with vertical stiffeners. The panel and the stiffeners are made of nonmetallic material and the stiffeners are adhesively bonded to the panel. The stiffeners each include an outwardly facing surface having a generally parabolic shape.

17 Claims, 4 Drawing Sheets

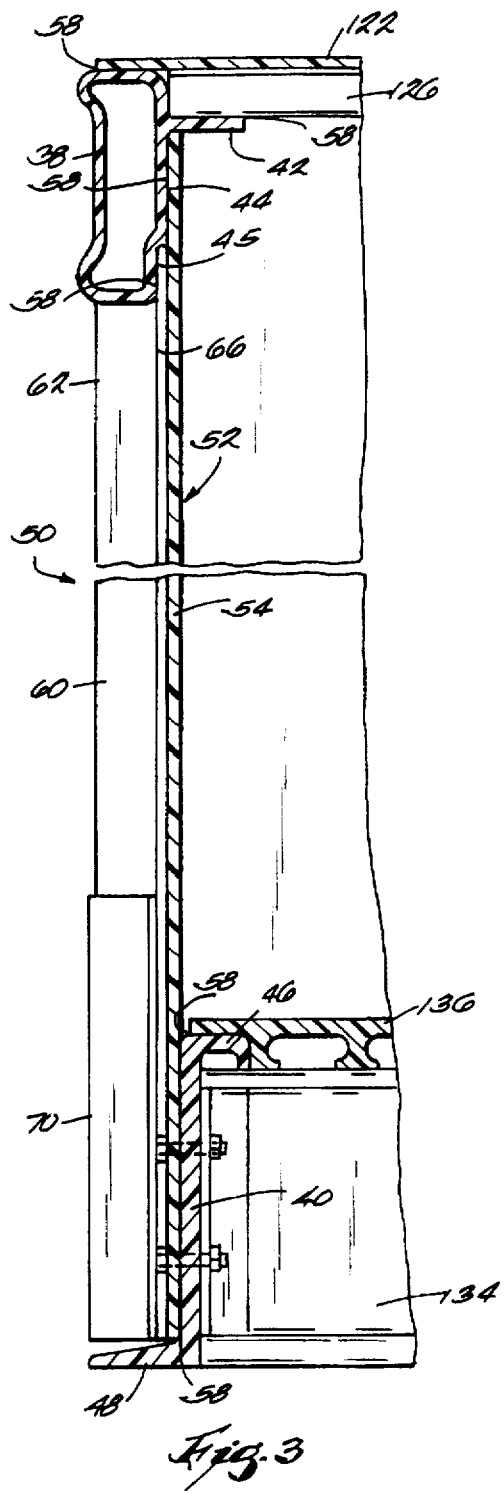
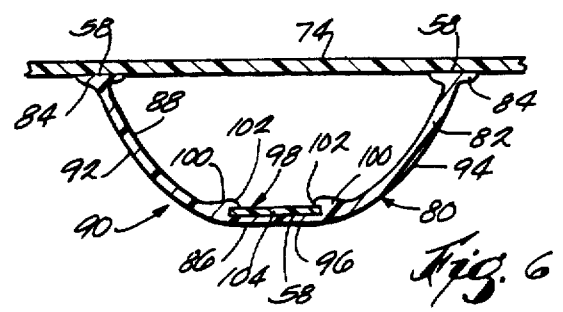
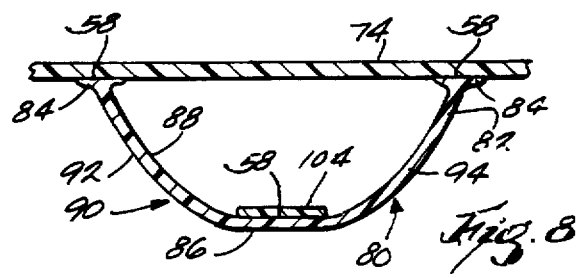
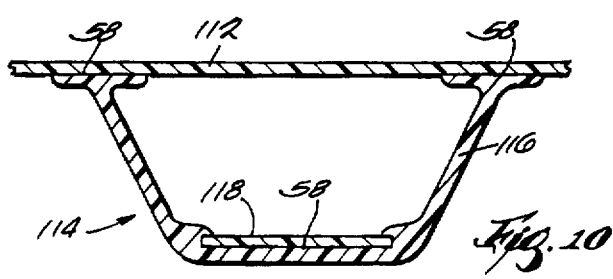

VEHICLE BODY INCLUDING LEAKPROOF DAMAGE RESISTANT WALL CONSTRUCTION

BACKGROUND OF THE INVENTION

1. Field of the Invention

The invention relates generally to vehicle bodies such as trailer and truck bodies, intermodal containers, and the like, and more particularly to wall constructions which are employed in those vehicle bodies.

2. Reference to Prior Art

Vehicle bodies, such as intermodal containers and trailer bodies, having aluminum wall constructions are well known. In one such construction, overlapping aluminum skins are riveted to one another to form side walls, and hat-shaped aluminum posts are riveted to the exterior surfaces (or interior surfaces) of the side walls to provide structural support for the aluminum skins. That wall construction provides a thin wall cross section which is important in maximizing interior cargo carrying space and which is generally structurally sound.

However, aluminum wall constructions are subject to some disadvantages. In particular, vehicle bodies made substantially entirely of metal are inherently heavy. Also, metal fasteners used in aluminum wall constructions can corrode or be subject to fatigue failure and loosening. Additionally, fastener holes and seams between wall skins form potential leak paths that provide sites for the penetration of water or other undesirable materials into the interior of the vehicle body.

A further disadvantage associated with prior art wall constructions having exposed posts is their susceptibility to damage resulting from catching the squared posts on obstructions. Such damage is potentially severe and is often costly and time consuming to repair. For example, in storage lots and shipyards, trailers and containers are often parked in very close proximity (i.e., within a couple of feet or less) to one another to save space. Unless care is taken when withdrawing a vehicle body from its parking spot, the side posts of the vehicle body can contact and catch on the corner of an adjacent vehicle body. This can cause the side posts to be ripped from the wall skins or the wall skins to be punctured.

SUMMARY OF THE INVENTION

The invention provides a vehicle body having an improved lightweight, weathertight, and damage resistant wall construction. The improved wall is made of nonmetallic, corrosion resistant material including fiber-reinforced plastic composite material, and the components of the wall are adhesively bonded together so that leak paths presented by fastener holes and wall skin seams are eliminated. Additionally, posts or stiffeners used to reinforce the walls are configured to reduce or eliminate damage to the wall in the event the stiffener is contacted or struck by an object, such as another vehicle body, for example.

More particularly, the invention provides a vehicle body such as an intermodal cargo container, a trailer or truck body, or the like, including front, top, bottom, and side walls arranged in a box-like structure to define a cargo-receiving interior space. The wall thicknesses of the vehicle body are preferably minimized to maximize interior cargo space, and the side walls are preferably made of a thin side panel formed by overlapping or abutting sheet-like wall skins. The wall skins are preferably made of fiber-reinforced plastic composite material and are adhesively bonded to one another to interconnect the skins and to seal the seams between adjacent skins. The composite material used to make the wall skins is capable of supporting the shear loads encountered by the walls during a life of rigorous service.

To reinforce the side panel of each wall against compressive and tensile loads exerted on the wall during normal use of the vehicle body, side posts or stiffeners are provided. The stiffeners are made of nonmetallic material such as a fiber-reinforced plastic composite material and are adhesively bonded over the wall skins to eliminate fasteners. The substitution of adhesive bonds for fasteners avoids leak and corrosion problems associated with fasteners. Also, in one embodiment, the adhesive bonds are stronger than the nonmetallic material used to make the stiffeners so that if a stiffener, such as a side wall stiffener for example, does catch on an object, the stiffener will fail before the adhesive bonds. This minimizes damage to the side wall.

In one embodiment, stiffeners used on the side walls each include a nonmetallic rib member that is adhesively bonded to one of the side skins. The material used to make the rib members is a thermoplastic polymer material that is capable of elastically deforming in the event that it contacts or catches on something. To reduce the possibility that the rib member will indeed catch on anything, its outer surface has arcuate portions and is preferably generally parabolically shaped in one embodiment. This stiffener, due to its design, is elastically deformable and is more likely to slide out of engagement with any obstruction than is the squared configuration of prior art side posts. The stiffener also includes a reinforcing member or insert mounted on the rib member. The reinforcing member is intended to stiffen the rib member and is preferably made of a fiber-reinforced plastic composite material.

In another arrangement, the stiffeners can be integrally formed of fiber-reinforced plastic composite material. In that arrangement the stiffener is preferably reinforced by thickening the cross section of its crown and/or by using higher strength filamentary material (such as graphite in the place of fiberglass for example) capable of supporting loads to which the stiffeners may be subjected.

Various other features and advantages of the invention will become apparent to those skilled in the art upon review of the following detailed description, claims, and drawings.

BRIEF DESCRIPTION OF THE DRAWINGS

FIG. 3 is an enlarged cross sectional view taken along line 3—3 in FIG. 2.

FIG. 6 is an enlarged view of part of the side wall section illustrated in FIG. 5.

FIG. 8 is view similar to FIG. 6 and illustrates a modified version of the stiffener shown in FIG. 6.

FIG. 10 is an enlarged cross sectional view taken along line 10—10 in FIG. 1 and shows an alternative front wall stiffener design.

Figure 1:
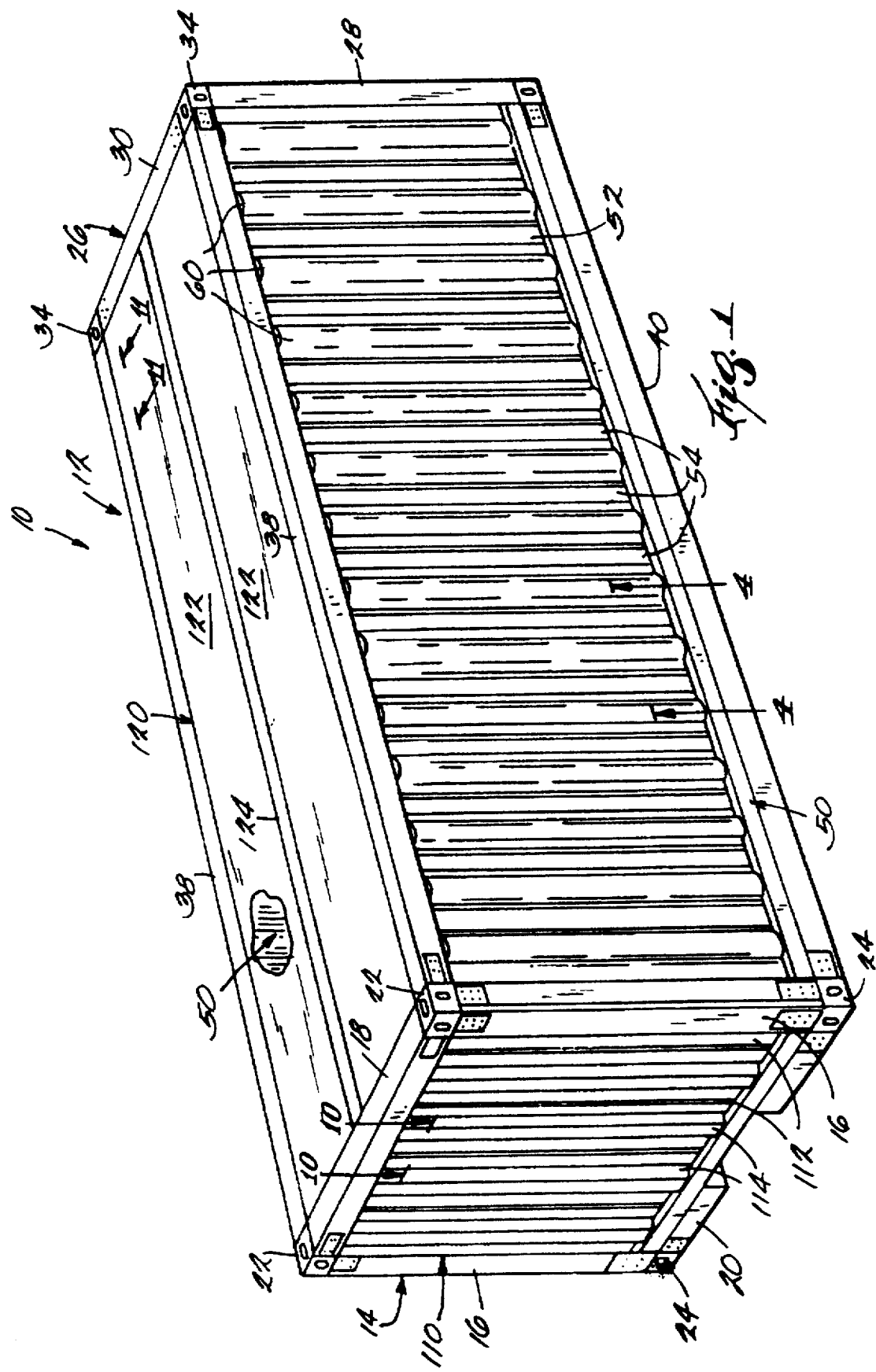
FIG. 1 is a perspective view, partially broken away for illustration, of a vehicle body embodying the invention.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF PREFERRED EMBODIMENTS

Illustrated in FIG. 1 is a freight hauling vehicle body 10 embodying the invention. While the vehicle body 10 can be integrated into a variety of freight hauling vehicles, such as to serve as a rail car body, a trailer or truck body, or a freight shipping container, in the illustrated embodiment the vehicle body 10 is an intermodal shipping container. More particularly, the container 10 illustrated in the drawings is an international Standards Organization (ISO) dry van container having a length of about forty feet.

As shown in FIG. 1, the container 10 comprises a frame 12. The frame 12 includes a rectangular front frame structure or stacking frame 14 having a pair of vertical front corner posts 16 interconnected by an upper crossmember 18 and a lower crossmember 20. Upper and lower lock-receiving front corner connectors or fittings 22 and 24, respectively, are provided at the four corners of the front stacking frame 14.

Figure 2:
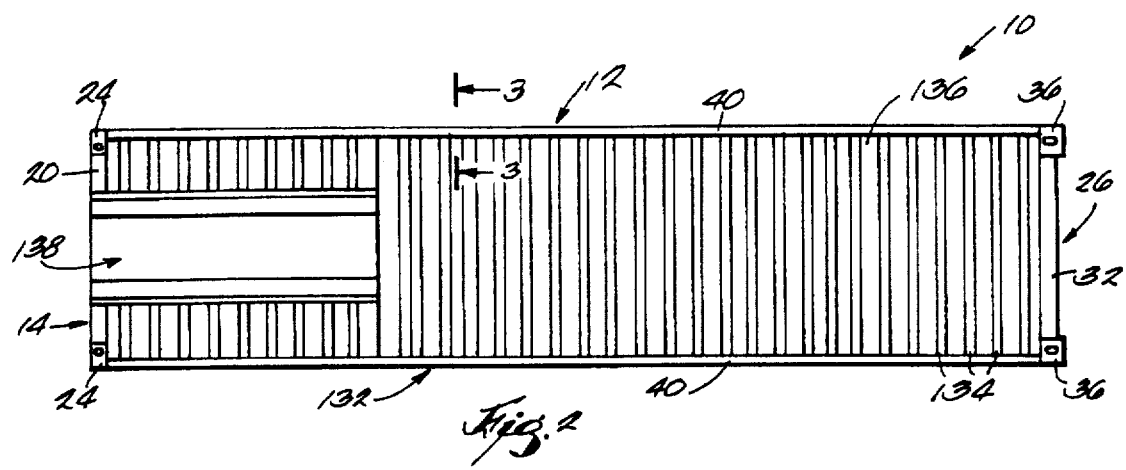
FIG. 2 is a reduced bottom plan view of the vehicle body illustrated in FIG. 1.

The frame 12 also includes a rectangular rear stacking frame 26 on which is mounted a set of doors (not shown) to access the interior of the container 10. The rear stacking frame 26 includes a pair of vertical rear corner posts 28 (only one of which is shown) interconnected by an upper crossmember 30 and (FIG. 2) a lower crossmember 32. Upper and lower lock-receiving rear connectors or fittings 34 and 36, respectively, are provided at the four corners of the rear stacking frame 30.

The upper fittings 22 and 34 and the lower fittings 24 and 36 are used to interconnect the container 10 with other containers (not shown) or with a support surface such as a ship deck, a railcar bed, or a trailer chassis, in a manner known to those skilled in the art. In the illustrated arrangement, the fittings 22, 24, 34, and 36 are standard intermodal fittings capable of receiving a locking device such as is disclosed in U.S. Pat. No. 4,626,155 issued Dec. 2, 1986 to Hlinsky et al., for example.

The frame 12 also includes (FIG. 1) a pair of upper rails 38 and (FIG. 2) a pair of lower rails 40 that all extend between the front and rear stacking frames 14 and 26. As shown in FIG. 3, each of the upper rails 38 includes an inwardly directed flange 42 and an inwardly facing surface 44 with a recessed surface portion 45. As also shown in FIG. 3, each of the lower rails 40 is generally Z-shaped and includes upper and lower flanges 46 and 48.

While the foregoing frame components can be made of metallic materials, in a preferred embodiment all of those components, with the exception of the fittings 22, 24, 34, and 36, are made of fiber-reinforced plastic material and are preferably formed via pultrusion. Pultrusion apparatus and methods known in the art are disclosed in U.S. Pat. No. 3,769,127 issued Oct. 30, 1973 to Goldsworthy et. al., and in U.S. Pat. No. 3,556,888 issued Jan. 19, 1971, and U.S. Pat. No. 2,871,911 issued Feb. 3, 1959, both to Goldsworthy, all of which are incorporated herein by reference. Briefly, the pultrusion process involves passing fibrous material through a resin bath and pulling the resulting composite through a die wherein the material is formed into the desired shape and cured.

The composite material used to produce the pultruded components includes a resin binder material, such as polyester resin which is sold by Owens-Corning as Model No. E606-6-12. Other suitable resins include, for example, various polyesters, polypropylenes, phenolics, epoxies, and polycarbonites. The composite material also preferably includes a multidirectional array of filamentary material dispersed throughout the cross section of the pultrusion. A suitable filamentary material is known in the industry as 113E-glass roving. Possible filamentary material substitutes include, for example, glass fibers known in the industry as E-, S-, S2- and A-glass fibers, as well as carbon, graphite, boron, and aramid fibers. If desired, the different filamentary materials can be mixed in the same part to customize the structural characteristics of that part to its particular application.

Figure 4:
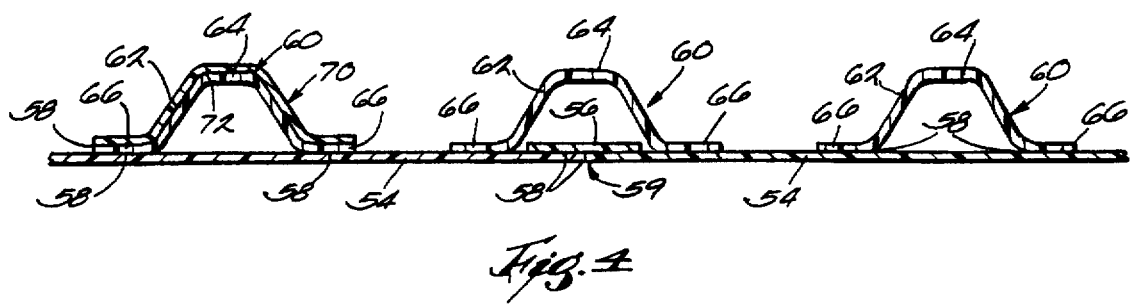
FIG. 4 is an enlarged cross sectional view taken along line 4—4 in FIG. 1 and illustrating a side wall section including a first stiffener design.

The container 10 also comprises walls mounted on the frame 12. Those walls include opposite side walls 50 (only one of which is shown entirely in FIG. 1 the other being a mirror image thereof) which each incorporate one of the upper rails 38 and one of the lower rails 40. Each of the side walls 50 also includes (FIG. 1) an elongated sheet-like side panel 52 that is mounted on the frame 12. More particularly, each side wall 50 includes a suitable number of side panel sections or skins 54 that are each preferably pultruded of the aforementioned composite materials. Referring to FIG. 4, the side skins 54 are arranged side-by-side in coplanar and contiguous relation and are closely spaced or abut one another, and adjacent pairs of the side skins 54 are bonded together via a joining member or splice plate 56 and adhesive material 58 to form a joint 59 therebetween. An example of a suitable adhesive material is a methacrylate adhesive sold by ITW Adhesive Systems of Farmington Hills, Mich. under the model designation A0420.

Referring to FIG. 3, to mount the side panel 52 of a side wall 50 on the upper and lower rails 38 and 40 thereof the upper ends of the side skins 54 are adhesively bonded to the inwardly facing surface 44 of the upper rail 38. The lower ends of the side skins 54 are also secured to the lower rail 40, preferably with adhesive material 58. The use of adhesive material 58 provides sealed joints between the side skins 54 and the upper and lower rails 38 and 40.

To stiffen the side panel 52 of each side wall 50 against vertically applied tensile and compressive loads, regularly spaced, vertically extending side wall posts or stiffeners 60 are provided on the side skins 54. While the stiffeners 60 could be made of metallic material, in the arrangement illustrated in the drawings the stiffeners 60 are pultruded of composite material including E-glass fibers. Each of the stiffeners 60 includes a hat portion 62 having a crown 64 with a thickened cross section to reinforce the stiffener 60 and flange portions 66. If desired, carbon or other fibers can be used in pultruding the stiffeners 60 to supplement or replace the E-glass fibers in the crown 64 to further strengthen the stiffener 60.

While the stiffeners 60 could be attached to the side skins 54 using various mechanical means, such as fasteners (not shown) for example, in a preferred arrangement the stiffeners 60 are bonded to the exterior sides of the side skins 54 with adhesive material 58. As shown in FIG. 3, a section of the hat portion 62 at the top of each stiffener 60 is removed so that the flange portions 66 can extend upwardly over the recessed surface portion 45 of the upper rail 38 and be adhesively bonded thereto.

As shown in FIG. 4, intermittent ones of the stiffeners 60 are positioned in straddling relation over a joint 59 between the side skins 54. This provides an additional seal and added protection to the joints between the side skins 54. Also, with that arrangement a damaged stiffener 60 over the joint between side skins 54 will fail independently of the joint so that the joint maintains its integrity.

To reduce the occurrence or extent of damage to the stiffeners 60 resulting from catching the stiffeners 60 on an obstruction, such as can occur when maneuvering the container 10 in close quarters with other containers for example, the hat portions 62 of the stiffeners 60 are generally trapezoidally shaped. This configuration encourages obstructions to glance off the stiffeners 60 or to at least avoid becoming hung-up on the stiffeners 60 and ripping the stiffeners 60 from the side walls 50.

In the event of damage to one of the stiffeners 60, the damaged stiffener 60 can be easily and quickly repaired with a patch member 70 (FIGS. 3 and 4). The patch member 70 is configured to fit over a damaged one of the stiffeners 60 and includes an inner surface 72 that corresponds to the outer surface of the stiffener 60. The patch member 70 is adhesively bonded over the damaged stiffener 60 and can be cut to any desired length depending upon the extent of the damage. As shown in FIG. 4, the patch member 70 is sized to fit over a stiffener 60 so that the crown of the patch member 70 does not extend outwardly beyond the outer margins of the upper and lower rails 38 and 40. Thus, the patch member 70 will not increase the overall outside width of the container 10.

Figure 5:
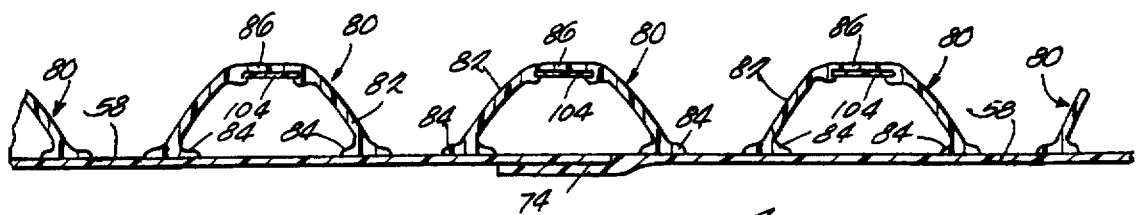
FIG. 5 is a view similar to FIG. 4 and illustrates a side wall section in accordance with a second embodiment of the invention.

Illustrated in FIGS. 5 and 6 is a second embodiment of the arrangement illustrated in FIG. 4. The second embodiment includes modified side skins 74 each having an inwardly offset portion 76 that overlaps the interior side of an adjacent side skin 74 so that the exterior surfaces of the side skins 74 form a substantially planar and continuous surface. Overlapping side skins 74 are bonded to one another with adhesive material 58 to form (FIG. 5) sealed seams or lap joints 78 therebetween.

The second embodiment illustrated in FIGS. 5 and 6 also includes modified stiffeners 80 that each includes a vertical post or rib member 82 having integral mounting flanges or feet 84. The stiffeners 80 are attached to the exterior sides of side skins 74 by bonding the feet 84 of the stiffeners thereto with (FIG. 6) adhesive material 58. The stiffeners 80 are preferably arranged so that each lap joint 78 is straddled by a stiffener 80. The rib member 82 of each stiffener 80 also includes a crown 86, an inner surface 88, and an outer surface 90 having arcuate outer surface portions 92 and 94, and a somewhat flattened outermost portion 96 at the crown 86. The surface portions 92, 94, and 96 combine to give the outer surface 90 of the rib member 80 a rounded contour, and more particularly a generally parabolic shape when viewed in cross section.

Means are provided on each rib member 82 for defining a vertically extending socket or pocket 98 along the inner surface 88 thereof. While various pocket defining means can be employed, in the illustrated arrangement such means includes (FIG. 6) a pair of projections 100. The outermost end portions of the projections 100 form lips 102 for holding an insert member in the pocket 98, as is further explained below.

In the embodiment illustrated in FIGS. 5 and 6, each of the rib members 82 is made of a thermoplastic polymer material which is elastically deformable when engaged by an object. The thermoplastic polymer material is not as strong as the bonds formed by the adhesive material 58 or the fiber-reinforced plastic composite material used to make the side skins 74. Thus, the rib member 82 will fail before those bonds or the side skins 74 so that the weathertightness of the container envelope is maintained despite damage to one or more stiffeners 80.

Each of the side wall stiffeners 80 also includes means for reinforcing its rib member 82. In the illustrated arrangement the means for reinforcing the rib member 82 reinforces the crown 86 of the rib member and includes (FIGS. 5 and 6) a reinforcing insert or member 104 that is insertable into the pocket 98. The insert member 104 is held in place against the inner surface 88 of the corresponding rib member 82 by the projections 100. If desired, the reinforcing member 104 can be adhesively bonded to inner surface 88 with adhesive 58 (see FIG. 6).

While the reinforcing member 104 can be variously configured, in the illustrated arrangement the reinforcing member 104 is a rectangular plank which is pultruded of the aforementioned fiber-reinforced plastic composite material. To further stiffen the reinforcing member 104, carbon or other fibers can be added to the E-glass fibers or can replace the E-glass entirely, as desired.

Figure 7:
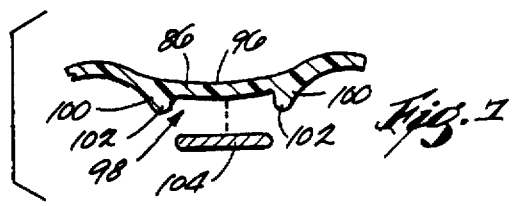
FIG. 7 is a partial cross sectional view depicting assembly of the stiffeners illustrated in FIGS. 5 and 6.

To insert the reinforcing member 104 into a corresponding rib member 82, the outer surface portion 96 of the rib member 82 is pressed inwardly (FIG. 7) so that the projections 100 are drawn away from one another a distance sufficient to permit the reinforcing member 104 to be fitted into the pocket 98. Thereafter, the outer surface portion 96 is released so that it snaps back to its original position. In that position, the projections 100 tightly grasp and confine the reinforcing member 104 within the pocket 98.

While in the embodiment shown in FIGS. 5 and 6 the rib member 82 is provided with a pocket 98, in other embodiments (see FIG. 8) the pocket 98 can be eliminated and the reinforcing member 104 can be mounted on the rib member by adhesive material 58 only.

Figure 9:
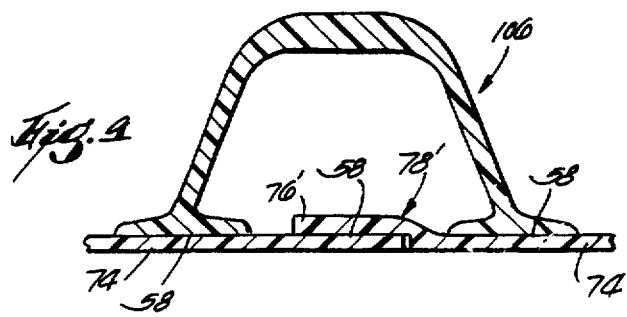
FIG. 9 is a view similar to FIG. 6 and illustrates a second alternative stiffener design shown positioned over a panel joint.

Illustrated in FIG. 9 is a stiffener 106 which is a modified version of the stiffeners 60 illustrated in FIGS. 3 and 4. FIG. 9 also shows the stiffener 106 overlaying a modified lap joint 78' formed by an outwardly offset portion 76' that replaces the inwardly offset portion 76 (FIG. 3). By replacing lap joints 78 with lap joints 78' the side walls are provided with smooth interior surfaces.

Figure 12:
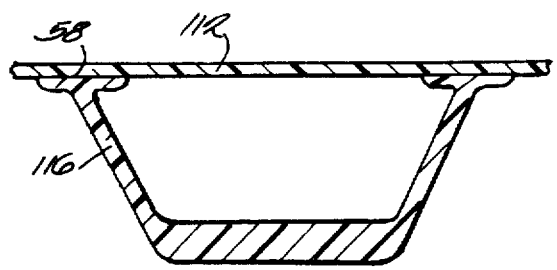
FIG. 12 is an enlarged cross sectional view similar to FIG. 10 and shows an alternative front wall stiffener design.

The walls also include (FIG. 1) a front wall 110. The front wall 110 includes overlapping front skins 112 that are adhesively bonded to one another to form a sheet-like front panel similar to side panel 52. The front wall 110 is also provided with front wall stiffeners 114 to reinforce the front skins 112. Referring to FIGS. 10 and 12 which show alternative front wall stiffener constructions, each front wall stiffener 114 can be constructed as a one-piece pultruded member (see FIG. 12) similar to side wall stiffeners 60 and 106. Alternatively, each front wall stiffener 114 can be constructed as a two-piece member (see FIG. 10) including a rib member 116 and a reinforcing member 118. If the front wall stiffeners 114 are two-piece members they are assembled as described above with respect to side wall stiffeners 60 (see FIGS. 7 and 8).

The walls also include (FIG. 1) a top wall 120 which incorporates the upper fittings 22 and 34. The top wall 120 includes sheet-like roof panel including roof skins 122 that are bonded together via adhesive material and a splice plate 124 to form a joint similar to the joint illustrated in FIG. 4 between adjacent side skins 54. In the illustrated arrangement the roof skins 122 and the splice plate 124 are also pultruded of composite material. In other arrangements, the roof could be a single continuous sheet and could be made of other materials such as a thermoplastic material.

Figure 13:
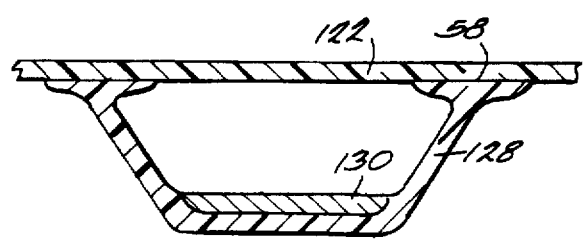
FIG. 13 is an enlarged cross sectional view similar to FIG. 11 and shows an alternative roof bow design.
Figure 11:
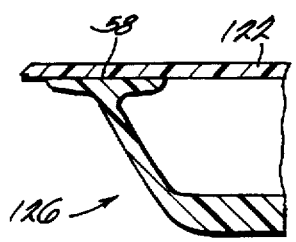
FIG. 11 is an enlarged cross sectional view taken along line 11—11 in FIG. 1 and shows an alternative roof bow design.

The top wall 120 also includes roof bows 126 (one is partially shown in FIG. 3) for supporting the roof skins 122. The roof bows 126 extend between the upper rails 38 and are similar in design to the front wall stiffeners 114. Referring to FIGS. 11 and 13 which show alternative roof bow constructions, each roof bow 126 can be a single piece pultruded member (see FIG. 11) or a two-piece member including a rib member 128 and a reinforcing member 130 (see FIG. 13). If the roof bows 126 are two-piece members they are assembled as described above with respect to side wall stiffeners 60 (see FIGS. 7 and 8).

The container 10 is also provided with (FIG. 2) a bottom wall 132 that incorporates the lower corner fittings 24 and 36 and that includes regularly spaced apart crossmembers 134 extending between the lower rails 40. The crossmembers 134 support (FIG. 3) a floor 136. The bottom wall 132 also includes a tunnel section 138 for receiving a chassis (not shown) so that the container 10 can be transported over the road.

Advantageously, walls 50, 110 and 120 are constructed of lightweight, nonmetallic overlapping skins that are sealed at their joints, and the alternative side wall stiffeners 60, 80, and 106, the front wall stiffeners 114, and the roof bows 126 are adhesively bonded to their associated walls to thereby avoid leak problems which can result with the use of fasteners. Additionally, the configurations of the stiffeners 60, 80, 106, and 114 and the use nonmetallic materials in those stiffeners renders the walls resistant to damage. If damage should occur, it is localized and tends not to penetrate the sealed envelope of the container 10, and the stiffeners can be easily repaired with a patch member such as patch member 70.

Various features and advantages of the invention are set forth in the following claims.

We claim:

1. A vehicle body comprising
top, bottom, and opposite side walls interconnected to form a box-like structure, said side walls including a plurality of skin members, each of said plurality of skin members having edges, said skin members being arranged in edge to edge relation and being respectively adhesively bonded to one another to form a sheet-like side wall panel; and
a plurality of stiffeners for reinforcing said sheet-like side wall panel, each of said plurality of stiffeners having a rib member including a side portion being adhesively bonded to one of said skin members and having a crown portion spaced from said skin member, said side portion of each of said rib members being relatively deflectable and said crown portion of each of said rib members being relatively stiff, and each of said stiffeners being made of a nonmetallic material.

2. A vehicle body as set forth in claim 1 wherein said nonmetallic material is a thermoplastic material.

3. A vehicle body as set forth in claim 1 wherein each of said rib members defines an extended pocket, and wherein each of said plurality of stiffeners includes a reinforcing member, said reinforcing member of each of said stiffeners being insertable into said pocket of said rib member thereof.

4. A vehicle body as set forth in claim 1 wherein each of said rib members includes opposite inner and outer surfaces, each of said rib members being made of a nonmetallic material, and wherein each stiffener includes a reinforcing member supported on said inner surface of said rib member of each of said stiffeners, said reinforcing members being made of a nonmetallic material that is different from said nonmetallic material of which said rib members are made.

5. A vehicle body as set forth in claim 1 wherein each of said skin members overlaps another of said skin members to form a lap joint, and wherein one of said stiffeners is positioned in straddling relation over said lap joint.

6. A vehicle body as set forth in claim 1 wherein each of said stiffeners includes an inner surface, and an outer surface having an arcuate outer surface portion.

7. A vehicle body as set forth in claim 1 wherein each of said stiffeners includes means for reinforcing said crown portion of each of said rib members.

8. A vehicle body as set forth in claim 7 wherein said means for reinforcing said crown portion of each of said rib members includes a reinforcing member made of a nonmetallic material.

9. A vehicle body comprising
top, bottom, and opposite side walls interconnected to form a box-like structure, said side walls including a plurality of skin members, each of said plurality of skin members having edges, said skin members being arranged in edge to edge relation and being respectively adhesively bonded to one another to form a sheet-like side wall panel; and
a plurality of stiffeners for reinforcing said sheet-like side wall panel, said stiffeners being adhesively bonded to said skin members, and each of said stiffeners being made of a nonmetallic material, wherein each of said stiffeners has a parabolically shaped outer surface.

10. A vehicle body comprising
top, bottom, and opposite side walls interconnected to form a box-like structure, said side walls including a plurality of skin members, each of said plurality of skin members having edges, said skin members being arranged in edge to edge relation and being respectively adhesively bonded to one another to form a sheet-like side wall panel; and
a plurality of stiffeners for reinforcing said sheet-like side wall panel, said stiffeners being adhesively bonded to said skin members, and each of said stiffeners being made of a nonmetallic material wherein each of said stiffeners includes a flattened outer surface portion and arcuate surface portions, each of said arcuate surface portions of each of said stiffeners extending from said flattened surface portion thereof toward one of said side walls of said box-like structure, and said arcuate surface portions and said flattened outer surface portion of each of said stiffeners combining to provide each of said stiffeners with a parabolic outer surface.

11. An intermodal container comprising
a top wall including a plurality of lock-receiving connectors,
a bottom wall including a plurality of lock-receiving connectors, and
a side wall extending vertically between said top and bottom walls, said side wall including a side panel having an interior surface and an exterior surface, said side panel being made of a nonmetallic material, and said side wall including a plurality of stiffeners, each of said stiffeners being adhesively bonded to said exterior surface of said side panel, wherein each of said stiffeners includes a vertically extending rib member having an outer surface which is parabolically shaped when viewed in cross section taken along a horizontal plane.

12. An intermodal container comprising a top wall including a plurality of lock-receiving connectors, a bottom wall including a plurality of lock-receiving connectors, and a side wall extending vertically between said top and bottom walls, said side wall including a side panel having an interior surface and an exterior surface, said side panel being made of a nonmetallic material, and said side wall including a plurality of stiffeners, each of said stiffeners being adhesively bonded to said exterior surface of said side panel, wherein each of said stiffeners includes a vertically extending rib member having an inner surface and a pair of opposed projections extending from said inner surface, said projections defining therebetween a vertically extending interior pocket, and wherein each of said stiffeners includes a reinforcing member which is supported on said inner surface of said rib member and which is insertable into said interior pocket.

13. A vehicle body comprising a top wall, a bottom wall, and a side wall interconnecting said top and bottom walls, said side wall including an upper rail made of a nonmetallic material, a lower rail made of a nonmetallic material, a plurality of sheet-like members being made of a nonmetallic material and being adhesively bonded together to form a side panel, said side panel being adhesively bonded to said upper rail and being adhesively bonded to said lower rail, and a plurality of stiffeners adhesively bonded to said sheet-like members to reinforce said side panel, each of said stiffeners being made of a nonmetallic material and each of said stiffeners including a side portion extending from one of said sheet-like members and including a crown portion spaced from said one of said sheet-like members, said side portion of said stiffeners being deflectable relative to said sheet-like members and to said crown portions.

14. A vehicle body as set forth in claim 13 wherein each of said sheet-like members overlaps another of said sheet-like members to form a lap joint therebetween, and wherein one of said stiffeners is positioned in straddling relation over each of said lap joint.

15. A vehicle body as set forth in claim 13 wherein said upper rail of said side wall includes an inwardly extending flange, and wherein said top wall includes a roof bow made of nonmetallic material, said roof bow being supported by said inwardly directed flange of said upper rail, and a roof panel.

16. A vehicle body as set forth in claim 13 wherein said lower rail of said side wall is Z-shaped, includes an inwardly extending upper flange, and includes an outwardly extending lower flange which extends outwardly beyond said stiffeners.

17. A vehicle body as set forth in claim 16 wherein said bottom wall includes a crossmember supported by said lower rail of said side wall, and a floor section supported on said crossmember, said floor section overlapping said upper flange of said lower rail.

* * * * *